(12) United States Patent  (10) Patent No.:  US 8,818,891 B1
DiCarlo  (45) Date of Patent:  Aug. 26, 2014

(54) ELECTRONICALLY NEGOTIATED ASSET SECURITIZATION

(76) Inventor: Dean DiCarlo, Huntington Beach, CA (US)

( * ) Notice: Subject to any disclaimer, the term of this patent is extended or adjusted under 35 U.S.C. 154(b) by 0 days.

(21) Appl. No.: 13/591,712

(22) Filed: Aug. 22, 2012

Related U.S. Application Data

(60) Provisional application No. 61/527,291, filed on Aug. 25, 2011.

(51) Int. Cl.
*G06Q 40/04* (2012.01)
*G06Q 30/08* (2012.01)

(52) U.S. Cl.
USPC ............................................................ 705/37

(58) Field of Classification Search
CPC .............................. G06Q 40/04; G06Q 30/08
USPC ................................................. 705/37, 36 R
See application file for complete search history.

(56) References Cited

U.S. PATENT DOCUMENTS

| | | | |
|---|---|---|---|
| 7,398,229 B2 * | 7/2008 | Budish ........................ | 705/26.3 |
| 7,461,022 B1 * | 12/2008 | Churchill et al. ............... | 705/37 |
| 7,895,103 B1 * | 2/2011 | Hendrix et al. ................. | 705/35 |
| 7,921,052 B2 * | 4/2011 | Dabney et al. .................. | 705/37 |
| 8,332,302 B1 * | 12/2012 | Erisman .......................... | 705/37 |
| 2002/0147670 A1 * | 10/2002 | Lange ........................... | 705/35 |
| 2002/0194115 A1 * | 12/2002 | Nordlicht et al. ............... | 705/37 |
| 2007/0083457 A1 * | 4/2007 | Evelyn et al. .................. | 705/37 |
| 2010/0057627 A1 * | 3/2010 | Lutnick et al. ................. | 705/80 |
| 2010/0088250 A1 * | 4/2010 | Magnolia et al. ........... | 705/36 R |
| 2010/0138290 A1 * | 6/2010 | Zschocke et al. .......... | 705/14.41 |

* cited by examiner

*Primary Examiner* — Sarah Monfeldt
*Assistant Examiner* — Ann Loftus
(74) *Attorney, Agent, or Firm* — Michael P. Fortkort, Esq.; Micahel P Fortkort PC

(57) ABSTRACT

An electronic negotiation auction platform derives final market pricing for and assembles the investor pool to fund a borrower's loan request or to sell an existing debt instrument. The platform conducts the auction in two phases. The first phase involves junior lienholders, whereas the second phase involves senior lien holders. Phase I comprises establishment of a purchase price by junior lienholders (B) tranche given minimum return information. Phase II comprises subscription of the (A) tranche which, now has a defined value and full range of information to consider the safest of the investment vehicles for this asset. Competition among investors desiring to participate in the (A) tranche results in a lower yield for the (A) tranche and a higher yield for the junior lienholders if the (A) tranche is oversubscribed. This extra yield is passed on to junior lienholders, serving as incentive to participate in the junior tranche.

20 Claims, 5 Drawing Sheets

ELECTRONICALLY NEGOTIATED ASSET SECURITIZATION

RELATED APPLICATIONS

This application claims priority to U.S. Provisional Patent Application No. 61/527,291 filed Aug. 25, 2011 by the same inventor and bearing the same title as the present application, which provisional application is hereby incorporated by reference as if repeated herein in its entirety, including the drawings.

BACKGROUND

The present invention relates generally to computer implemented methods and apparatuses for exchanging financial products, and more particularly, to a computer implemented method and apparatus for exchanging financial products, such as whole loans on a secondary market.

In a secondary market, mortgages are exchanged between lenders and investors. Loans include consumer loan products that are traditional primary residence mortgage loans to consumers. When a lender has made a loan, they often try to sell the loan to a mortgage banker. Often, lenders bulk loans to investors, such as mortgage bankers (i.e., pass several loans referred to as a "pool" of loans).

The role of the mortgage banker is to buy loan pools from the loan origination organization (e.g., mortgage bank) or lender, and then pool them in such a way to make them attractive to other potential investors.

Large institutional investors, such as Freddie Mac, insurance companies, large hedge funds, bond funds, and pension funds, buy closed mortgage loans in pools.

The pools can be securitized and sold to other investors as mortgage-backed securities, wherein the investor groups several pools of loans together into a larger pool, and uses them collectively as collateral to back securities (i.e., mortgage-backed securities, such as bonds). Typically, these groups of loan pools are valued in the range of $50 million-$1 billion. Because the company that purchases the loan pools and uses them to back securities is personally responsible, there is a great deal of risk involved in these types of transactions. These larger pools can then be offered for sale to buyers on the secondary market. The pools can have different asset classes mixed together making it risky for an investor trying to buy a particular class. For example, non-conforming loans, such as sub-prime mortgages can be mixed with conforming loans in a pool. Traditionally, a pool would be purchased as a whole.

Recently, the large pools can be separated and marketed as smaller pools of mortgages in order for small and mid-sized investment institutions to participate in the market.

SUMMARY OF THE INVENTION

According to one aspect of the present invention, a computer implemented method for securitizing a loan against an asset includes a two-phased auction based on a seller established reserve price, which can be received by an electronic auction platform operating in accordance with the present invention. Descriptive information regarding the asset may be displayed over the internet or other communications network to potential bidders. An operator uses a terminal to establish initial parameters, such as general selling terms, a purchase and sale agreement, an operating agreement and an initial profit/interest split. These initial parameters may be displayed over the internet or other communications network to potential bidders. The electronic auction platform opens bidding for a first junior lienholder tranche (B tranche) for a predetermined period of time. At closing of bidding in the B tranche, when and if the B tranche is fully subscribed, the purchase price is established. Information regarding the established purchase price for the asset is displayed over the Internet or other communications network to one or more bidders for a senior lienholder tranche (A tranche). The electronic auction platform opens bidding in the A tranche for a predetermined period of time. At closing of bidding in the A tranche, if the A tranche is not fully subscribed, the electronic auction platform reduces a size of the B tranche by a seller specifiable amount and removes one or more investors in the B tranche that placed their bids last from the B tranche, thereby shrinking a size of the B tranche and reducing the purchase price for the asset. The electronic auction platform then reopens bidding in the (A) tranche using the reduced purchase price for the asset.

According to another aspect of the present invention, an apparatus for securitizing a loan against an asset includes an operator terminal, and an electronic auction platform coupled to each other and coupled to potential bidders over the Internet or other communications networks. The operator terminal enables an operator to establish a reserve price, a size of a junior lienholder tranche (B tranche), and initial parameters, such as general selling terms, a purchase and sale agreement, an operating agreement and an initial profit/interest split. Displays display descriptive information regarding the asset and the initial parameters to potential bidders. These displays are coupled to the operator terminal and the electronic auction platform over the Internet or other communications network. The electronic auction platform is coupled to the operator terminal and the one or more displays. The electronic auction platform controls bidding by potential bidders. First, the electronic auction platform opens bidding for the junior lienholder tranche (B tranche) for a predetermined period of time. At closing of bidding in the B tranche, if the B tranche is fully subscribed, the purchase price is established. The electronic auction platform then provides information regarding the established purchase price for the asset to bidders for a senior lienholder tranche (A tranche) via the one or more displays and then opens bidding in the A tranche for a predetermined period of time. The electronic auction platform closes bidding in the A tranche upon expiration of the predetermined period of time. If the A tranche is not fully subscribed at closing, the electronic auction platform reduces a size of the B tranche using a seller specifiable amount, removes one or more investors in the B tranche that placed their bids last from the B tranche, thereby shrinking a size of the B tranche and reducing the purchase price for the asset, and reopens bidding in the (A) tranche using the reduced purchase price for the asset.

DETAILED DESCRIPTION

Figure 1:
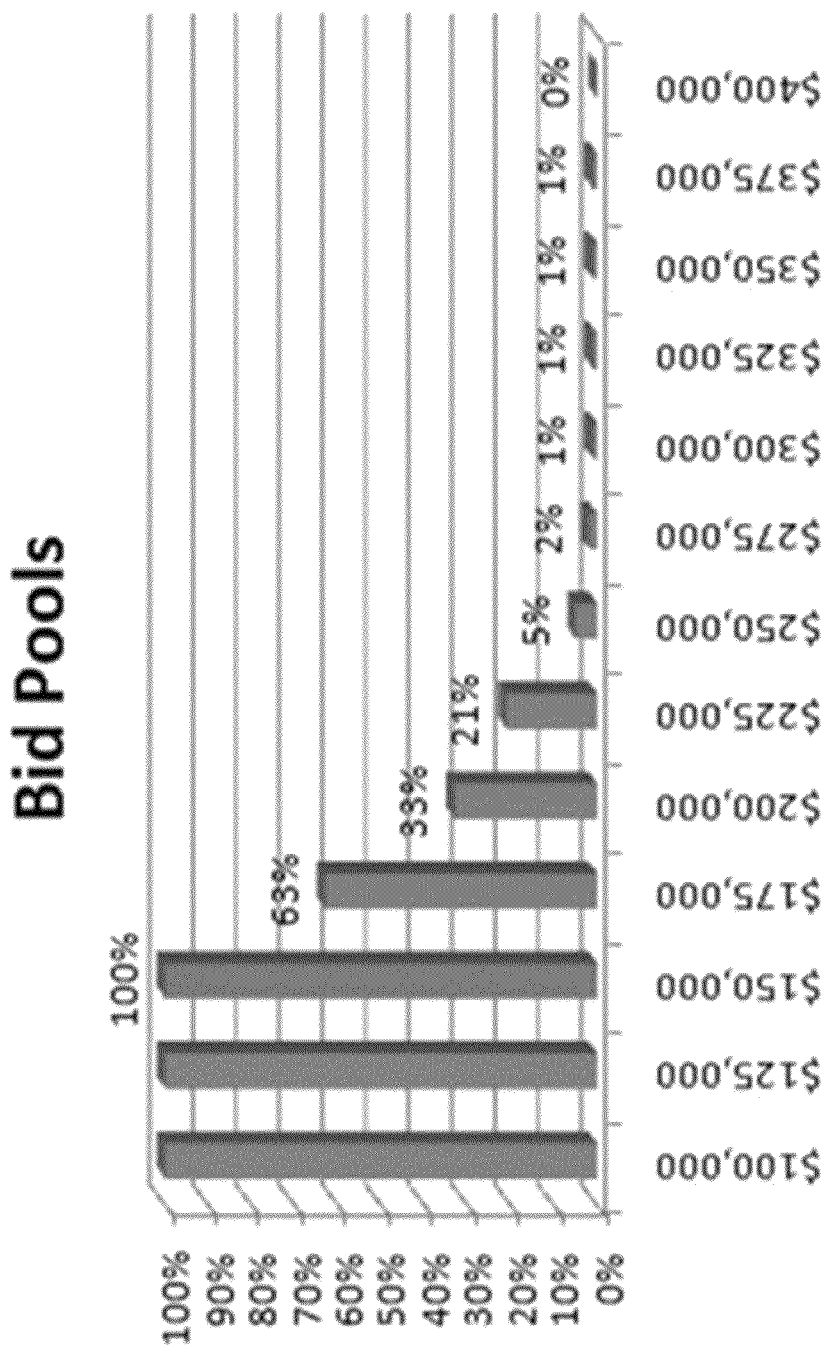
FIG. 1 depicts price discovery for a B tranche in a secondary market transaction according to one aspect of the present invention.

The present invention provides an electronic negotiation auction platform to derive final market pricing for, and assemble the investor pool to fund a borrower's loan request or to sell an existing debt instrument.

According to one aspect of the present invention, the electronic auction platform conducts the auction in two phases. The first phase involves junior lienholders, whereas the second phase involves senior lien holders. Phase I comprises establishment of a purchase price by junior lienholders (B) tranche given minimum return information. There may be more than one type of junior lienholder, having different risk, return parameters and a different level of seniority. (i.e., there could be B, C and D tranches) In any event, the most junior tranche will be filled first to establish initial pricing and then be confirmed as more senior tranches are filled in order of their seniority, with the most secure tranches being filled last. Phase II comprises the subscription of the (A) tranche which, now has a defined value and full range of information to consider the safest of the investment vehicles for this asset. Competition among investors desiring to participate in the (A) tranche results in a lower yield for the (A) tranche and a higher yield for the junior lienholders in the case where the (A) tranche is oversubscribed. This extra yield is passed along to the junior lienholders, which serves as an additional incentive to participate in the junior tranche.

This model works for both secondary loan transactions in which the existing note rate is predetermined and bidders will determine asset pricing, and subsequently achievable yield, as well as in origination opportunities in which the loan amount is predetermined and the only variable in price discovery is note rate by averaging the final yield for both tranches after competitive bidding.

In every instance, basic transparency is provided to potential investors into the information surrounding the borrower, the loan documents, the credit structure of the security being negotiated and the collateral. An operating agreement defines management practices and sets forth predetermined actions in the event of default. The opportunity to allow certain investors to make key decisions in some situations can be described in the operating agreement. This may be structured in any number of ways including but not limited to: (i) a structure by which the top three owners of the A shares have a vote equivalent to their ownership in certain key circumstances, however, if there is only one large investor in the A round, the large investor would control the decision making process; or (ii) the top 2 investors in the A round and the top investor in the B round; or (iii) no investor decision making privileges, but a very detailed and robust chain of events in the instance of default.

To keep borrower information completely confidential, borrower qualifications such as credit and ability to pay are handled by a credit rating agency, which would only publish an overall rating of borrower ability to repay, thus allowing the borrower to remain virtually anonymous and avoiding any disclosure of sensitive borrower information. The results of income verification and credit scoring could be posted as, for example, qualifies, comfortably qualifies, or highly-qualified. This would be the difference between someone with a 620-680 credit score, for example.

Seller or borrower at their election, are given the opportunity to set floor pricing or maximum note rate at which the transaction may be consummated.

Use of quantitative risk metrics to establish a starting baseline from which to begin automated negotiation. The variables below may be modified based on the results of the quantitative risk analysis without departing from the scope of the present invention.

Secondary Market Example:
Known Variables:
Details surrounding the security (Table 1).

| Tranche | Pro rata purchase % | Return of Capital | Interest/Profit |
| --- | --- | --- | --- |
| A (senior) | 70% | 70% | 50% |
| B (junior) | 30% | 30% | 50% |

Quantitative risk metric determines profit/interest distribution ratios. In this case, a 50/50 split was chosen as the most effective way to incent junior tranche purchasers. A riskier asset may require a greater percentage of the profits interest to reflect the added return required to fill up the B tranche. A more stable or less risky asset might find percentages migrating closer to the pro-rata purchase %.

Yields will be disclosed based on an asset performing through several different potential maturities and scenarios to give investor's context regarding potential yields under several different outcomes (e.g., 5 year early payoff, 10 year payoff, YTM, and liquidation in 1 year upon borrower default).

Salient information describes the risk of the asset. This list will include but not be limited to: (i) Collateral description—e.g., current collateral valuation (s); (ii) borrower risk assessment and qualifications—updated credit scores; (iii) loan performance—payment history; and/or (iv) existing note terms and collateral rights to be assigned.

Exemplary Process:
1. Seller selects reserve price
2. Transparency regarding the asset is assembled from seller and third party data providers
3. Sellers utilize quantitative risk metrics to establish initial parameters such as:
   a. General selling terms
   b. Which purchase and sale agreement is used
   c. Initial profit/interest splits which should generate sufficient yield potential to attract sufficient junior tranche investors such that sellers reserve will be achievable and sufficient returns will also be attractive enough to generate sufficient interest in the senior (A) tranche.
4. Purchase and sale agreement and operating agreement is selected and disclosed to potential bidders
5. Bidding opens on B tranche. Investors are asked to bid on their bid amount and the maximum sales price for the entire asset, e.g., Investor A would like to invest $5,000 to acquire a $1/30$th undivided interest in the junior (B) tranche of the house on 123 Main Street. This might be represented as "shares" of the loan using 1,000 or some other standard number as a denominator for simplicity, which would make this order, 5 shares of 150. To make bidding simple, this would be entered as:
   a. Bid Amount: $5,000
   b. Maximum Loan Amount at which I'd like to participate: $600,000.
      i. In this example, the B tranche is 25% and A tranche is 75%.
      ii. The investor understands that he/she is in a junior position, but the extra percentage of profits distribution can provide a 20% return if the asset continues to perform and the borrower pays through maturity.
6. NOTE: Bids may be placed as "all or none", which gives institutions the flexibility to bid on acquiring an entire asset or an entire tranche.

7. Once the B tranche has been filled and the bidding duration is up, the B tranche is now considered subscribed and the purchase price for the asset has been determined.

8. The A tranche is now provided with the same information with the addition of the newly determined asset purchase price.
   a. Example. Since the B Tranche was sufficiently subscribed at $150,000 and given the predetermined 75%/25% profit split, the total purchase price for the asset will be $600,000 and the A tranche now needs $450,000 to be fully subscribed. Given the splits, the bidders for the A tranche will now be asked to bid on 2 variables:
      i. The amount they would like to bid and the size, say $15,000 for an undivided 0.333% interest in the A tranche.
      ii. The yield that they would like to achieve if the loan goes to maturity.
         1. Bidders may outbid each other by lowering their yield requirements, which in effect will reduce the A tranche's distribution percentage.
         2. Example: if the A tranche is oversubscribed at $450,000, then bidders may elect to select an amount they would like to participate but lower alter the profit splits to the benefit of the B tranche investors. So, an investor may bid $15,000 for a 0.333% undivided interest in the A tranche but with profit splits being modified to 75.5 given to the B tranche and 24.5% provided to the A tranche. This extra yield will entice investors to participate in junior tranches.
   b. Transparency into asset for all investors will be readily available and junior (B) tranche investors which are the most at risk will establish market pricing in isolation from any syndication revenue or revenue derived from the origination of the instrument and thus will lower the likelihood that pricing will escalate to unsupported levels.

9. If A tranche is not fully subscribed at the closing of the second phase of the auction, the size of the B tranche will be reduced by a certain amount elected by the seller with guidance from a consulting firm and the last investors to place their bids will be removed from the B tranche to shrink the size of the tranche and the purchase price for the asset. This will reduce the total purchase price and bidding on the (A) tranche will start over with a different level of risk due to the lower purchase price.

FIG. 1 shows a chart of price discovery for the B tranche in a secondary market transaction. The bid pools and amounts for the chart are listed in Table 2. When a bid pool is oversubscribed, bidders with the highest bids are given priority. In this auction, 37% of the bidders at $150,000 will not participate. Decisions on which participants are excluded can be by size of bid, timing of bid, maximum bid amount or any other method selected by the seller.

TABLE 2

| Bid<br>Bid Pools | Amount<br>Bid Pools |
| --- | --- |
| $100,000 | 261% |
| $125,000 | 205% |
| $150,000 | 137% |
| $175,000 | 63% |
| $200,000 | 33% |
| $225,000 | 21% |
| $250,000 | 5% |
| $275,000 | 2% |

TABLE 2-continued

| Bid<br>Bid Pools | Amount<br>Bid Pools |
| --- | --- |
| $300,000 | 1% |
| $325,000 | 1% |
| $350,000 | 1% |
| $375,000 | 1% |
| $400,000 | 0% |

New Origination Example:

Known Variables:
1. Amount on both tranches
2. All other information known in the secondary market example.
3. Any discount points offered by the seller
4. Seller/borrower average note rate reserve. Reserve will be met when a combination of the yields on the best bids for each tranche results in a price that is lower or meets the seller's reserve Exemplary Process:
1. Same process as above, except both tranches may bid simultaneously and each bidder is asked to bid on a yield to maturity basis as well as the amount that they would like to participate.

Example:
1. Borrower would like a $300,000 loan at a maximum rate of 6% and is offering 1 discount points to further incent bidders.
2. Bidding on B tranche starts at an 11% yield based on results of the quantitative risk analysis
3. Bidding on A tranche starts at 5%. Within the 2 week bidding period, yield is driven down by competitive bidding on the B tranche to 9%.
4. Once the A tranche is fully subscribed at 4.71%, the bidding reserve has been met. Any further reduction in yields will result in a lower note rate for the borrower.

Exemplary Embodiment of Method for Securitizing Asset

Figure 2:
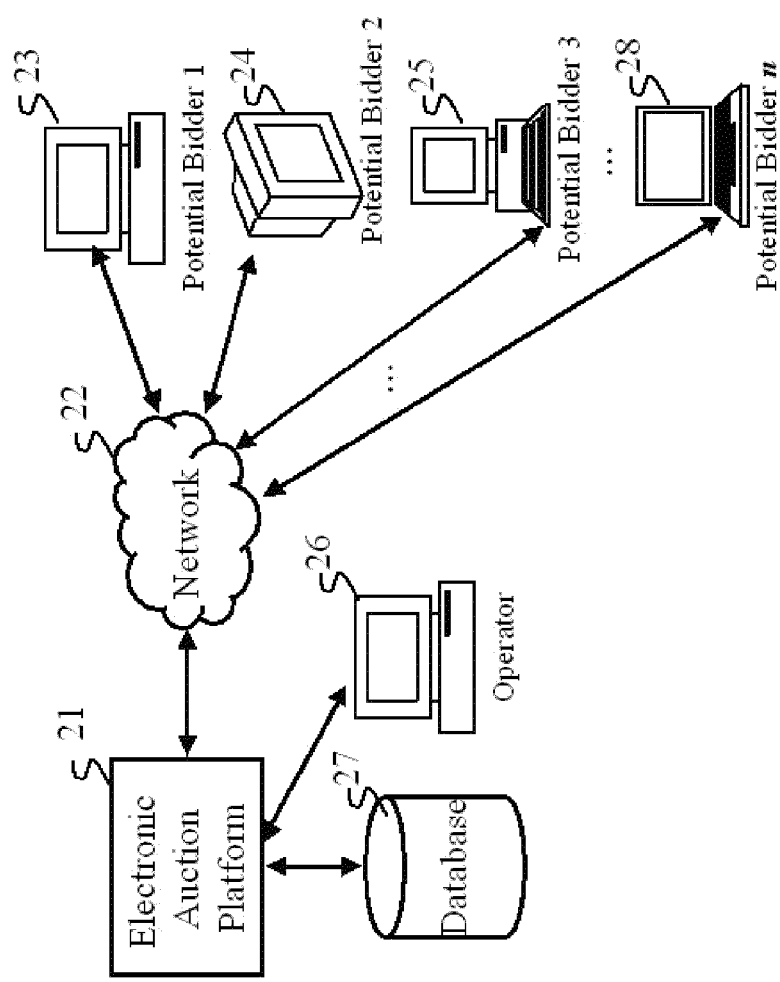
FIG. 2 depicts an exemplary embodiment of an apparatus for securitizing a loan against an asset according to another aspect of the present invention.
Figure 3:
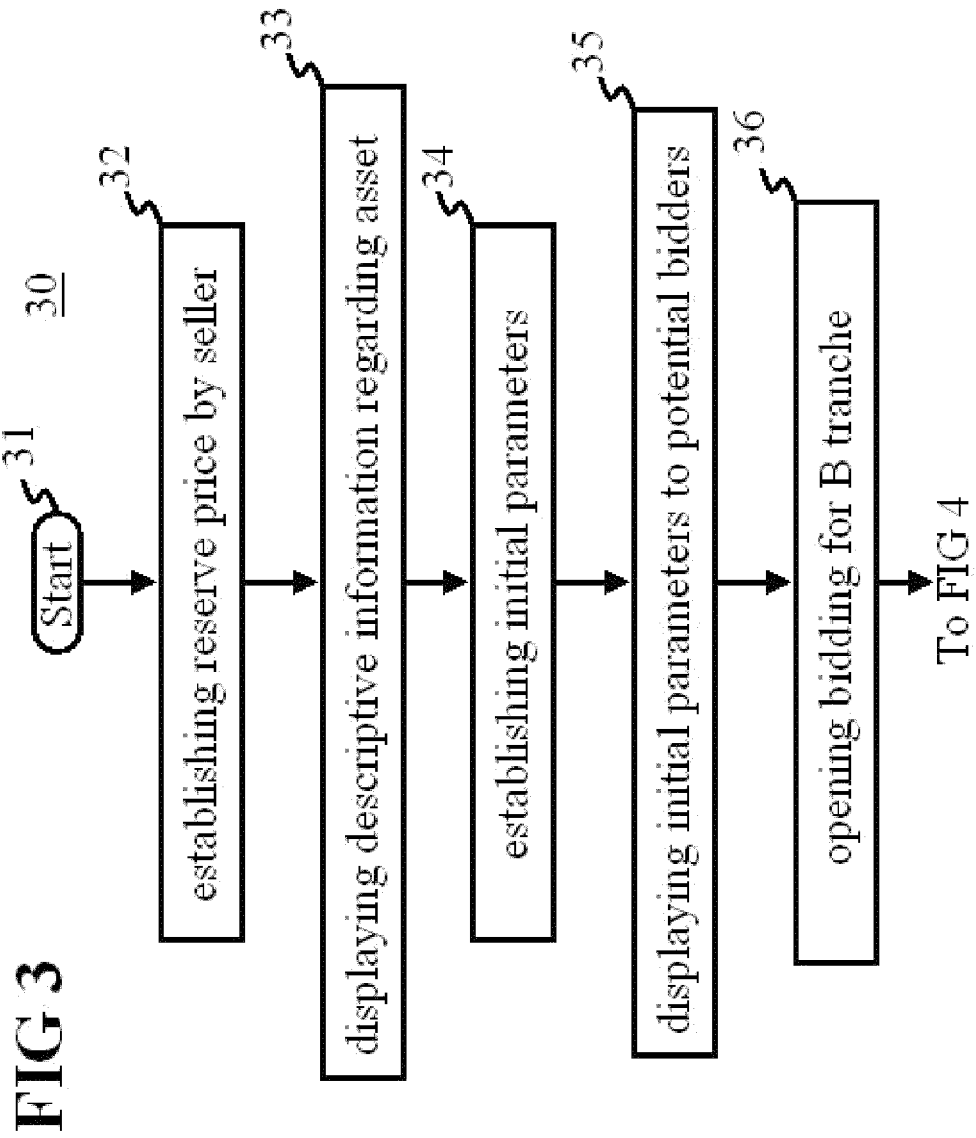
FIGS. 3-5 depict an exemplary embodiment of a method for securitizing a loan against an asset according to yet another aspect of the present invention.
Figure 4:
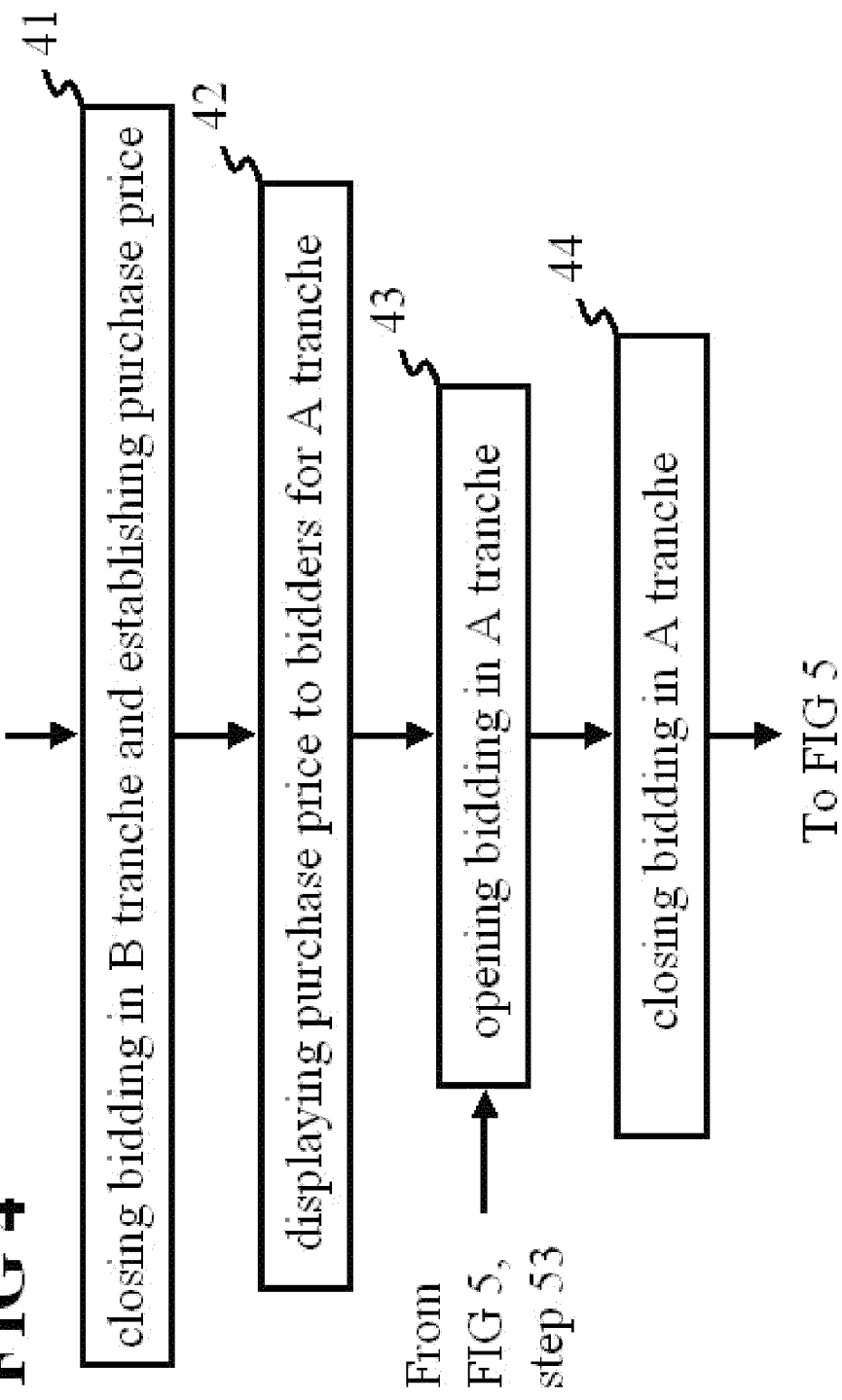
Figure 5:
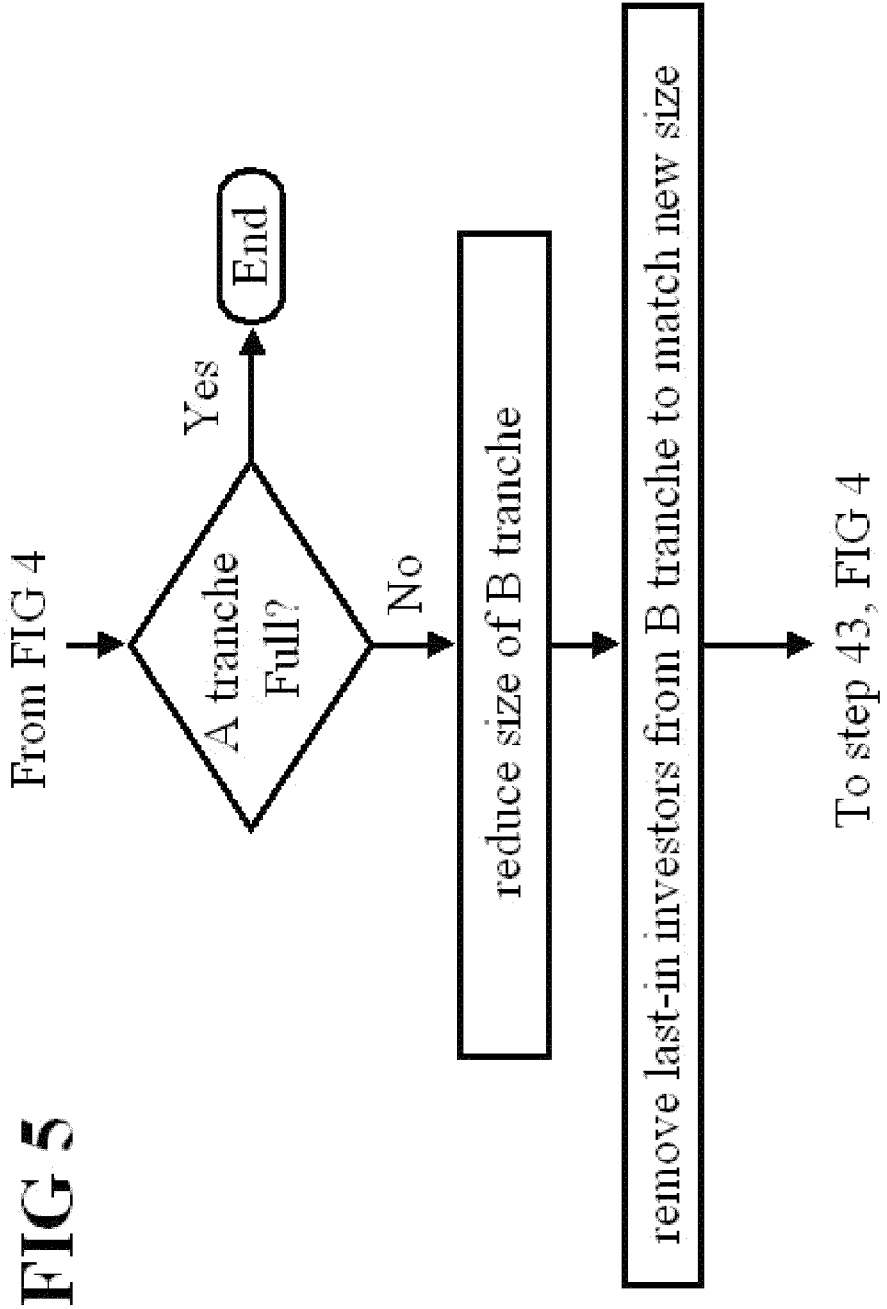

Turning to FIG. 3, shown therein is a computer implemented method 30 for securitizing a loan against an asset according to one aspect of the present invention. The method 30 includes a two-phased auction based on a seller established reserve price, which can be received by an electronic auction platform (see FIG. 2, 21) operating in accordance with the present invention. Descriptive information regarding the asset may be displayed over the Internet or other communications network 22 to potential bidders, which are accessing the electronic auction platform 21 via devices 23, 24, 25 and 28. An operator uses a terminal 26 to establish initial parameters, such as general selling terms, a purchase and sale agreement, an operating agreement and an initial profit/interest split. These initial parameters are stored in database 27 and may be displayed over the Internet or other communications network to potential bidders via devices 23, 24, 25 and 28. The electronic auction platform 21 opens bidding for a first junior lienholder tranche (B tranche) for a predetermined period of time. At closing of bidding in the B tranche, when and if the B tranche is fully subscribed the purchase price is established. Information regarding the established purchase price for the asset is displayed over the Internet or other communications network 22 to one or more bidders for a senior lienholder tranche (A tranche) via devices 23, 24, 25 and 28. The electronic auction platform 21 opens bidding in the A tranche for a predetermined period of time. At closing of bidding in the A tranche, if the A tranche is not fully subscribed, the electronic auction platform 21 reduces a size of the B tranche by a seller specifiable amount and removes one or more investors in the B tranche that placed their bids last from the B tranche, thereby shrinking a size of the B tranche and reducing the purchase price for the asset. The electronic auction platform 21 then reopens bidding in the (A) tranche using the reduced purchase price for the asset.

Turning to FIG. 2, an apparatus 20 for securitizing a loan against an asset includes an operator terminal 26, and an electronic auction platform 21 coupled to each other and coupled to one or more potential bidders over the Internet or other communications network 22 or series of networks.

The operator terminal 26 can be a personal computer or standard workstation. The electronic auction platform 21 may be a main computer, series of computers, servers, workstations or other computer system able to accept multiple inputs from many users simultaneously, such as a server operating a web site to clients that access the website. The operator terminal 26 enables an operator to establish a reserve price, a size of a junior lienholder tranche (B tranche), and the initial parameters including general selling terms, a purchase and sale agreement, an operating agreement and an initial profit/interest split.

A database 27 maintains all information regarding the auction and the loan and related asset. The database 27 can be a standard database, such as an Oracle database.

One or more displays, such as devices 23, 24, 25 and 28, display descriptive information regarding the asset and the plurality of initial parameters to one or more potential bidders. These displays are coupled to the operator terminal 26 and the electronic auction platform 21 over the Internet or other communications network 22. The electronic auction platform 21 is coupled to the operator terminal 26 and the one or more displays, such as devices 23, 24, 25 and 28. The electronic auction platform 21 controls bidding by one or more potential bidders. Devices 23, 24, 25 and 28 may be any type of display devices, such as personal computers, laptops, workstations, IPADs, IPODs, cell-phones, portable display devices, blackberries, or the like capable of displaying a web page or similar image.

Benefits Of Electronically Negotiated Single Asset Securitization

The present invention provides an attractive alternative to existing mortgage securitization systems that will prove useful to wean markets from dependence on government created entities, such as Freddie Mac and Fannie Mae.

Moreover, the present invention provides a mechanism for institutions to compete for assets with full transparency and to essentially create their own "hand-picked" securitizations. This will improve liquidity and ultimately provide price improvement based on market forces.

Additionally, the present invention shifts markets from a build and sell model to a merchandizing model by which investment advisors can custom select assets which meet their clients' investment objectives.

Still further, the present invention provides ultimate transparency in the data repository. Ongoing data repository and integration of third party vendors make instruments highly liquid in the secondary market. At any point, a holder of instruments may choose to resell their interest if their investment objectives change or to capture appreciation if spot rates vary from note rate or if the characteristics of the loan change (e.g., property values increase making the B tranche a less risky investment).

Furthermore, the present invention allows for government to invest in even less risky assets with taxpayer dollars (if necessary). The present invention allows for government to have a very targeted approach to investing/subsidizing specific types of assets (e.g., government could allocate a certain amount of capital to revitalization areas at a really low rate of return in order to provide higher B tranche yields to entice private capital investment in those areas).

At the same time, the present invention allows for precisely targeted investment strategies and the ultimate flexibility with respect to diversification.

An additional benefit of the present invention is that the riskiest capital determines the purchase price and the A tranche serves to sanity check this price. If the B tranche is subscribed at a certain purchase price, but the A tranche is not subscribed, the B tranche is trimmed until the A tranche is filled.

Moreover, speculation on real estate and housing has always been limited to those who have the resources (time, energy, capital) to purchase an investment that far exceeds most individual's total assets. If speculation is broken down into small, manageable, passive shares of investment and the investor has a full menu of choices and opportunities, these investors will be inclined to participate. Given the ability to speculate with a few thousand dollars and still have the ability to diversify, many investors would now have the access to contribute to homeownership, hopefully relieving the government from having to bear the entire burden.

Additionally, the A tranche serves as synthetic leverage for B tranche, thus incentivizing investors bearing the risk to make investments to keep capital markets flowing.

Still, when the inherent market risk subsides and RE values prove more stable, the same sort of access could be used to funnel private capital into more stable and smaller yields that still may outperform other more risky investments.

Finally, mutual funds or other investment vehicles could form that would make investments in both types of tranches, also creating liquidity.

Additionally, the different traunches could be split with a senior and subordinated lien to create the different structure. For example, after the bidding mechanism to create the appropriate risk traunches, the senior A traunche would have a yield of 4% (as determined by the bidding mechanism) and would actually be created with a first Trust Deed going up to a 60% LTV of the property. The subordinated B traunche would be a second Trust Deed on the property and the loan would accrue at a much higher rate of interest, such as 11%, up to a 75% CLTV and would be naturally in a much more exposed position as it is a second Trust Deed and junior lien. Handling the transaction in this manner may avoid certain cumbersome fees and regulation if the traunches can be demarcated by selling the traunches as completely different instruments. One may create a small limited liability corporation and avoid the securities issues associated with fractionalization with different deals to different owners.

What is claimed is:

1. A computer implemented method for securitizing a loan against an asset comprising:
opening bidding using an electronic auction platform for a junior lienholder tranche (B tranche) for a first predetermined period of time;
closing by the electronic auction platform bidding in the B tranche, wherein when the B tranche is fully subscribed the purchase price is established;
opening bidding by the electronic auction platform in the A tranche for a second predetermined period of time;
closing bidding in the A tranche by the electronic auction platform;
wherein if the A tranche is not fully subscribed at closing:
(i) reducing a size of the B tranche by a seller specifiable amount via an input to the electronic auction platform; and (ii) removing one or more bids of one or more investors in the B tranche that placed their bids last from the B tranche by the electronic auction platform, thereby shrinking a size of the B tranche and reducing the purchase price for the asset; and (iii) reopening bidding by the electronic auction platform in the (A) tranche using the reduced purchase price for the asset.

2. The computer implemented method according to claim 1, further comprising:
enabling a seller to establish a reserve price using a graphical user interface.

3. The computer implemented method according to claim 1, further comprising:
displaying descriptive information regarding the asset.

4. The computer implemented method according to claim 1, further comprising:
displaying to one or more bidders for a senior lienholder tranche (A tranche) the established purchase price for the asset.

5. The computer implemented method according to claim 1, further comprising:
establishing a plurality of initial parameters regarding the asset via a graphical user interface.

6. The computer implemented method according to claim 5, wherein said plurality of initial parameters includes one or more of the following: general selling terms, a purchase and sale agreement, an operating agreement and an initial profit/interest split.

7. The computer implemented method according to claim 5, further comprising:
displaying the plurality of initial parameters to one or more potential bidders.

8. An apparatus for securitizing a loan against an asset comprising:
an operator terminal to enable an operator to establish a size of a junior lienholder tranche (B tranche); and
an electronic auction platform coupled to the operator terminal, said electronic auction platform to control bidding by one or more potential bidders, wherein the electronic auction platform:
(i) opens bidding for the junior lienholder tranche (B tranche) for a first predetermined period of time;
(ii) closes bidding in the B tranche upon expiration of the first predetermined period of time, wherein when the B tranche is fully subscribed the purchase price is established;
(iii) opens bidding in the A tranche for a second predetermined period of time; and
(iv) closes bidding in the A tranche upon expiration of the second predetermined period of time;
wherein if the A tranche is not fully subscribed at closing, the electronic auction platform:
(i) reduces a size of the B tranche using a seller specifiable amount;
(ii) removes one or more bids of one or more investors in the B tranche that placed their bids last from the B tranche, thereby shrinking a size of the B tranche and reducing the purchase price for the asset; and
(ii) reopens bidding in the (A) tranche using the reduced purchase price for the asset.

9. The apparatus according to claim 8, wherein said operator terminal enables the operator to establish a plurality of initial parameters.

10. The apparatus according to claim 8, wherein said plurality of initial parameters includes one or more of the following: general selling terms, a purchase and sale agreement, an operating agreement and an initial profit/interest split.

11. The apparatus according to claim 8, further comprising:
one or more displays to display descriptive information regarding the asset and the plurality of initial parameters to one or more potential bidders, said displays being coupled to the operator terminal.

12. The apparatus according to claim 8, wherein said operator terminal enables the operator to establish a reserve price.

13. The apparatus according to claim 8, wherein the electronic auction platform provides the established purchase price for the asset to one or more bidders for a senior lienholder tranche (A tranche).

14. The apparatus according to claim 8, wherein the electronic auction platform provides the established purchase price for the asset to one or more bidders for a senior lienholder tranche (A tranche) via the one or more displays.

15. A non-transitory computer readable medium having encoded thereon instructions for a processor to execute a method for securitizing a loan against an asset, said method comprising:
opening bidding using an electronic auction platform for a junior lienholder tranche (B tranche) for a first predetermined period of time;
closing by the electronic auction platform bidding in the B tranche, wherein when the B tranche is fully subscribed the purchase price is established;
opening bidding by the electronic auction platform in the A tranche for a second predetermined period of time;
closing bidding in the A tranche by the electronic auction platform;
wherein if the A tranche is not fully subscribed at closing:
(i) reducing a size of the B tranche by a seller specifiable amount via an input to the electronic auction platform; and
(ii) removing one or more bids of one or more investors in the B tranche that placed their bids last from the B tranche by the electronic auction platform, thereby shrinking a size of the B tranche and reducing the purchase price for the asset; and
(iii) reopening bidding by the electronic auction platform in the (A) tranche using the reduced purchase price for the asset.

16. The non-transitory computer readable medium according to claim 15, wherein the method further comprises:
displaying to one or more bidders for a senior lienholder tranche (A tranche) the established purchase price for the asset.

17. The non-transitory computer readable medium according to claim 15, wherein the method further comprises:
enabling a seller to establish a reserve price using a graphical user interface.

18. The non-transitory computer readable medium according to claim 15, wherein the method further comprises:
displaying descriptive information regarding the asset.

19. The non-transitory computer readable medium according to claim 15, wherein the method further comprises:
enabling an operator to establish a plurality of initial parameters via a graphical user interface.

20. The non-transitory computer readable medium according to claim 19, wherein the plurality of initial parameters include one or more of the following:
general selling terms, a purchase and sale agreement, an operating agreement and an initial profit/interest split.

* * * * *